(12) United States Patent
Webster (10) Patent No.: US 9,519,130 B2
(45) Date of Patent: Dec. 13, 2016

(54) FORCE-INSENSITIVE FABRY-PEROT ETALON

(75) Inventor: Stephen Andrew Webster, Teddington (GB)

(73) Assignee: THE SECRETARY OF STATE FOR BUSINESS, INNOVATION AND SKILLS OF HER MAJESTY'S BRITANNIC GOVERNMENT, London (GB)

( * ) Notice: Subject to any disclaimer, the term of this patent is extended or adjusted under 35 U.S.C. 154(b) by 716 days.

(21) Appl. No.: 13/883,332

(22) PCT Filed: Oct. 14, 2011

(86) PCT No.: PCT/GB2011/051999
§ 371 (c)(1),
(2), (4) Date: May 3, 2013

(87) PCT Pub. No.: WO2012/063033
PCT Pub. Date: May 18, 2012

(65) Prior Publication Data
US 2013/0229713 A1    Sep. 5, 2013

(30) Foreign Application Priority Data
Nov. 12, 2010  (GB) .................................. 1019152.6

(51) Int. Cl.
*G02B 5/28* (2006.01)
*G02B 26/00* (2006.01)

(52) U.S. Cl.
CPC ............. *G02B 26/001* (2013.01); *G02B 5/284* (2013.01)

(58) Field of Classification Search
CPC ............. G02B 5/20; G02B 5/28; G02B 5/284; G02B 6/29358; G01J 3/26
(Continued)

(56) References Cited

U.S. PATENT DOCUMENTS 4,392,229 A * 7/1983 Hostetler ................ H01S 3/038
356/459
4,477,188 A * 10/1984 Stiles .................... G01C 19/668
356/471

(Continued)

OTHER PUBLICATIONS

Webster et al. (Force-insensitive optical cavity, Opt. Lett. 36, 3572-3574 (Sep. 15, 2011)).*

(Continued)

*Primary Examiner* — Kimberly N Kakalec
(74) *Attorney, Agent, or Firm* — Thomas | Horstemeyer, LLP (57) ABSTRACT

A Fabry-Perot etalon is provided with first and second partially reflecting mirrors (12, 14) attached to a cuboidal spacer (16). The spacer (16) has a cylindrical bore (18) through its center and the mirrors (12, 14) are bonded, on axis, to opposite ends of this bore (18). Four support elements (22-28) are arranged symmetrically with respect to the axis in a tetrahedral configuration and constrain the cuboidal spacer (16) in all degrees of freedom. The cuboidal spacer (16) is flattened at its vertices, which results in modified distortion of the spacer (16) under the action of a compressive force acting through the supports. This structure of etalon provides insensitivity to inertial forces due to acceleration in all six degrees of freedom (three linear and three rotational) simultaneously with insensitivity to differential forces.

20 Claims, 6 Drawing Sheets

(58) Field of Classification Search
USPC .......... 359/260, 582, 584, 489; 372/92–108; 356/450–521
See application file for complete search history.

(56) References Cited

U.S. PATENT DOCUMENTS

| | | | |
|---|---|---|---|
| 4,839,903 A * | 6/1989 | Simms | G01C 19/668 356/471 |
| 6,276,806 B1 | 8/2001 | Skillicorn | |
| 2002/0005988 A1 | 1/2002 | Duska et al. | |

OTHER PUBLICATIONS

Leibrandt et al., Spherical reference cavities for frequency stabilization of lasers in non-laboratory environments, Optics Express vol. 19, No. 4, pp. 3471-3482 (Feb. 14, 2011).*
PCT Search Report and Written Opinion in co-pending, related PCT Application No. PCT/GB2011/051999, mailed Oct. 14, 2011.

* cited by examiner

Rotation $R_y = R_1 + R_6$   $R_z = R_5 + R_4$ $R_x = R_2 + R_3$

Deformation $D_5 = R_1 - R_6$   $D_6 = R_5 - R_4$ $D_4 = R_2 - R_3$

FORCE-INSENSITIVE FABRY-PEROT ETALON

CROSS-REFERENCE TO RELATED APPLICATION

This application is the 35 U.S.C. §371 national stage of PCT Application No. PCT/GB2011/051999, entitled "Force-Insensitive Fabry-Perot Etalon" and filed Oct. 14, 2011, which is herein incorporated by reference in its entirety and which also claims priority to, and the benefit of, Great Britain patent application 1019152.6, filed Nov. 12, 2010, which is herein incorporated by reference in its entirety.

The present invention relates to a Fabry-Perot etalon and in particular to an assembly which is insensitive to the effects of forces upon which the etalon may be subjected during use, in particular inertial and differential forces.

Fabry-Perot etalons, or interferometers, are used in a variety of applications such as interference filters, telecommunication networks, optical wave meters, laser resonators, for laser absorption spectrometry as well as in astronomy and space applications, in addition to many other uses. In many applications, the etalon must have a structure which is physically solid and stable, to withstand forces to which the etalon may be subjected during use, caused by acceleration, temperature changes and many other effects. If the structure of the etalon is changed, for example if the distance between the mirrors of the etalon is altered or their relative orientation is varied, this has an adverse impact upon the functioning of the etalon, which can result in the generation of erroneous signals or erroneous control which relies upon the performance of the etalon.

The present invention seeks to provide a structure of Fabry-Perot etalon which is insensitive or substantially insensitive to forces to which the etalon may be subjected in practice. In the preferred embodiment, the Fabry-Perot etalon is designed such that its length, therefore frequency, is substantially insensitive to inertial forces due to acceleration in all six degrees of freedom (three linear and three rotational) whilst at the same time being substantially insensitive to differential forces applied to the etalon.

According to an aspect of the present invention, there is provided a Fabry-Perot etalon including first and second partial mirrors spaced from one another by a generally cuboidal spacer element, which spacer element is provided with sides which provide support, respectively, for the first and second mirrors; an optical cavity extending between the first and second partial mirrors and having an optical axis; the vertices of the spacer element being truncated.

This structure of spacer element provides insensitivity to differential forces applied to the etalon.

In the preferred embodiment, there is provided a plurality of support elements for supporting the spacer element and being located symmetrically about the optical axis of the cavity.

This arrangement of support elements can give the etalon insensitivity to inertial forces due to acceleration in all six degrees of freedom (three linear and three rotational). When combined with a cuboidal spacer element as taught herein, the etalon is simultaneously insensitive to inertial and differential forces. These features are considered to provide an etalon with significantly better characteristics than known etalon assemblies.

A compressive force, directed towards the centre of the cavity, is preferably applied at the supports.

There are preferably provided four support elements on the spacer element, arranged in the form of a tetrahedron.

Preferably, the support elements include holding spheres. Advantageously, the generally cuboidal spacer element is provided with flattened contact surfaces at the location of the holding spheres.

The spacer element is preferably formed from ultra-low expansivity glass and the first and second mirror elements are preferably provided on substrates made from silica.

In an embodiment, the etalon includes an annulus, preferably of silica, between each of said mirrors and their associated flattened end of the spacer element.

The annuli assist in making the etalon assembly substantially insensitive to temperature.

According to another aspect of the present invention, there is provided a Fabry-Perot etalon including first and second partial mirrors spaced from one another by a generally cuboidal spacer element, an optical cavity extending between the first and second partial mirrors and having an optical axis, and a plurality of support elements for supporting the spacer element and being located on the spacer element symmetrically about the optical axis of the cavity.

This structure of support makes the etalon substantially insensitive to inertial forces due to acceleration in all six degrees of freedom (linear and rotational).

Embodiments of the present invention are described below, by way of example only, with reference to the accompanying drawings, in which:

FIGS. 11a and b are respectively perspective and side elevational views of another embodiment of etalon which is substantially insensitive to force and temperature; and FIG. 11c is a cross-sectional view showing a finite-element model of thermal expansion.

Figure 1:
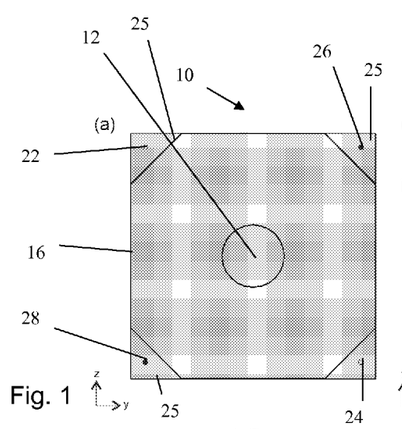
FIGS. 1 to 3 show, respectively, a front elevational view, a plan view and a perspective view of a preferred embodiment of etalon provided with a cuboidal spacer and which is insensitive to inertial and differential forces.
Figure 2:
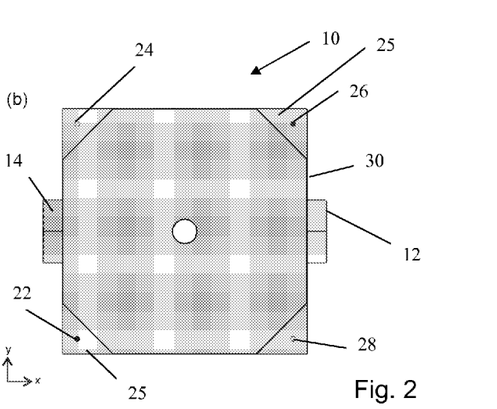
Figure 3:
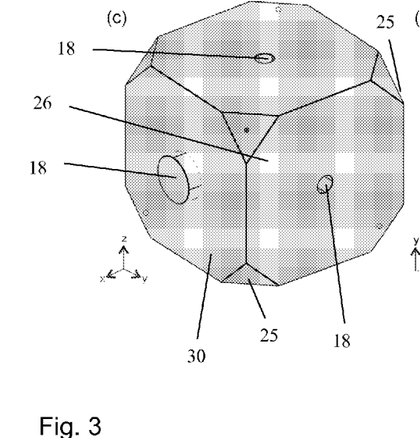
Figure 4:
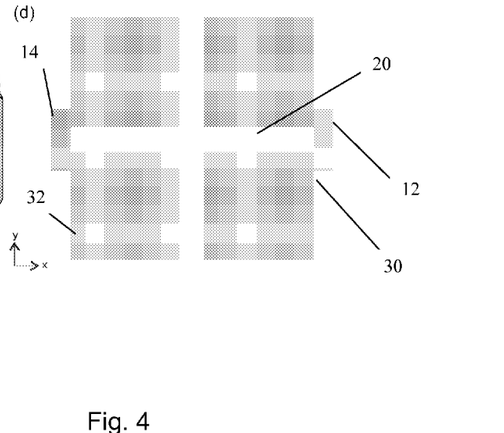
FIG. 4 shows a transverse cross-sectional view of the etalon of FIGS. 1 to 3 in use, this being shown in schematic form.

Referring to FIGS. 1 to 4, the etalon 10 of the preferred embodiment is formed of a pair of partially reflective mirrors 12, 14 attached to a cuboidal spacer 16 with truncated vertices 25. FIGS. 1 and 2 are, respectively, projections in the yz and xy planes respectively; while FIG. 3 shows the geometry of the cubic etalon in perspective view supported at four points in a tetrahedral configuration. FIG. 4 is a cross-section through the plane z=0. In FIGS. 1 to 3, the solid (open) circles indicate the positions of the supports 22 to 28 which are visible in (obscured by) the projection.

The spacer 16 has in this embodiment three cylindrical bores 18 which extend orthogonally relative to one another and pass through the centre point of the cube to the centre points of their respective faces. One of the bores is obscured by the mirror 12 in FIG. 3, but is visible in the cross-sectional view, FIG. 4. The mirrors 12, 14 are bonded, on axis, to opposite ends of one of the bores 18. The bore 18 provides a void 20 in the spacer element which allows the propagation of light between the mirrors.

In an embodiment, mirrors are bonded to opposite ends of all three bores to form three orthogonal cavities.

In the preferred embodiment, the spacer 16 is made from ULE and has an edge dimension of 50 mm. The two mirrors 12, 14 are fused-silica mirrors and are optically contacted at opposite ends of the bore 18 which lies along the x-axis. The vertices of the cube are truncated (as shown by reference numeral 25) to a depth of 6.7 mm forming eight plane surfaces normal to the body diagonals of the cube. The mirrors 12, 14 have the following dimensions: outer diameter=12.7 mm; thickness=4.0 mm; radius of curvature of concave surface=500 mm; inner diameter of contacting annulus=8.5 mm. It is to be appreciated that these dimensions are illustrative and not necessarily unique.

Thus, the mirrors 12 and 14 are typically curved, preferably spherically curved. An optical cavity is formed between the inner surfaces of the mirrors 12, 14 and the frequencies of the optical cavity modes are given by $$f = \frac{Nc}{2l}$$

where c is the speed of light, l is the distance between the points at the centres of the two mirror surfaces and N is an integer. Thus the frequency of a cavity mode is defined by the length of the cavity.

It will be appreciated that the length of the optical mode supported by the cavity which is formed by the two mirrors 12, 14 can be approximated as the distance between the centres of the mirror surfaces.

In the preferred embodiment, four supports 22-28 arranged in a tetrahedral configuration constrain the cuboidal spacer 16 in all degrees of freedom (as described in further detail below) and the optical axis is placed symmetrically with respect to these supports. In FIGS. 1 to 3, the solid (open) circles indicate the positions of the supports 22 to 28 which are visible in (obscured by) the projection.

Other embodiments may include eight supports each provided at a respective corner bevel or wedge of the spacer 16.

An inertial force due to acceleration acting upon the etalon 10 will cause this to undergo elastic deformation. However, due to the high degree of symmetry, the length, and hence frequency, of the cavity mode is substantially insensitive to inertial forces due to acceleration in all degrees of freedom (linear and rotational).

A second-order sensitivity remains: that due to the inertial force arising from uniform rotation (centrifugal force). Using finite-element analysis, the fractional sensitivity is calculated to be $-5.3(+7.6) \times 10^{-12}$ s$^2$ for rotation about the optical axis (about axes perpendicular to the optical axis).

More specifically, an inertial force acting on the etalon 10 causes it to undergo elastic deformation and the points at the centres of the mirrors 12, 14, which define the optical cavity length, are displaced. The modified cavity length is then:

$$l' = [(u_1 - u_2 + l)^2 + (v_1 - v_2)^2 + (w_1 - w_1)^2]^{1/2},$$

where u, v and w are the displacements in the x, y, and z direction respectively at the two mirror centres, denoted by the subscripts 1 and 2. The fractional change in length or frequency is given by:

$$\frac{\Delta l}{l} = \frac{\Delta v}{v} = \frac{l' - l}{l}.$$

Figure 7:
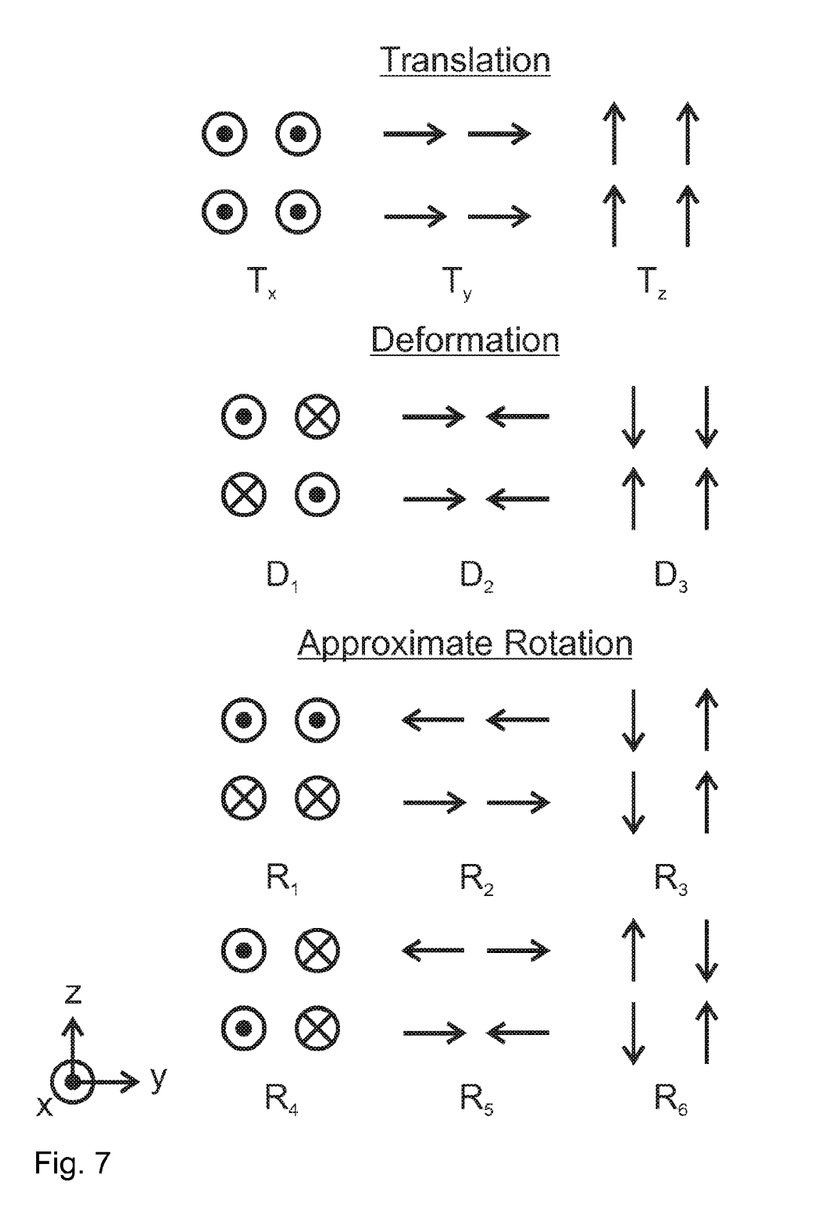
FIG. 7 shows the 12 degrees of freedom which are constrained, taking into account the frictional forces acting at the support. The directions of the forces acting at the support points are shown for each degree of freedom.
Figure 8:
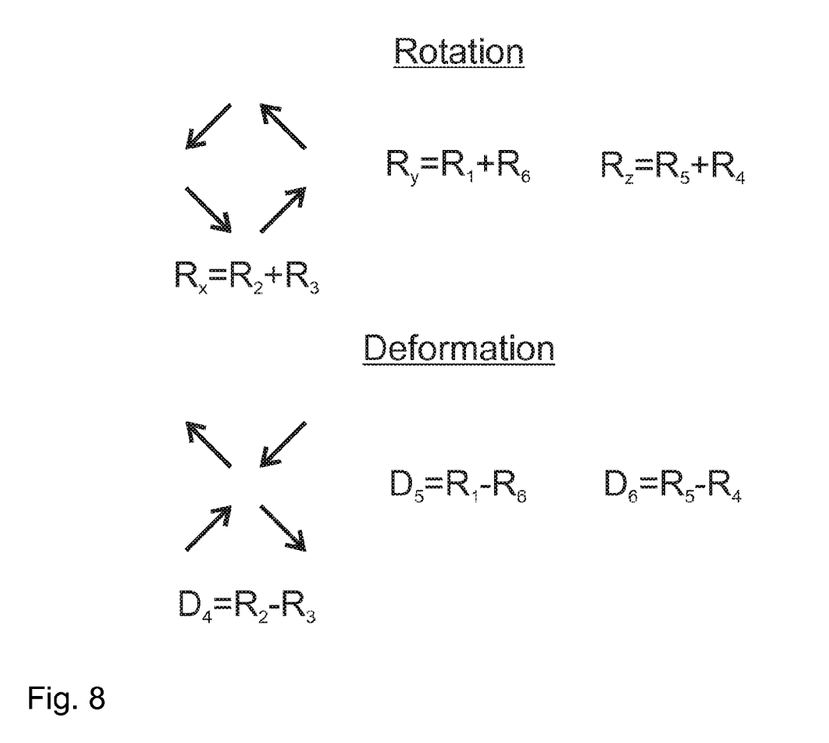
FIG. 8 shows the degrees of freedom corresponding to pure rotation and deformation formed from combinations of the approximate rotations shown in FIG. 7.

For the symmetrical arrangement shown in FIGS. 1 to 4, Table 1 below gives the displacements under the six possible inertial forces due to acceleration that can act on the etalon 10 and the corresponding and fractional length changes. The quantities a-e denote displacements and are used to show the symmetries present. The column, $\Delta l/l$, uses the leading term in the Taylor expansion of l'. In describing the direction of the inertial force acting upon the etalon 10, the following terms are used: axial—along x; transverse—along y, z; roll—rotation about x; pitch—rotation about y; yaw—rotation about z. Due to symmetry, the two transverse directions are identical and pitch and yaw are identical. The terms in brackets ($T_x$, $T_y$, etc.) are the labels given to the degrees of freedom as they are shown in FIGS. 7 and 8.

TABLE 1

| inertial force | $u_1$ | $u_2$ | $v_1$ | $v_2$ | $w_1$ | $w_2$ | $\frac{\Delta l}{l}$ |
|---|---|---|---|---|---|---|---|
| axial ($T_x$) | a | a | 0 | 0 | 0 | 0 | 0 |
| transverse ($T_y$) | 0 | 0 | b | b | c | $-c$ | $\frac{2c^2}{l^2}$ |
| transverse ($T_z$) | 0 | 0 | c | $-c$ | b | b | $\frac{2c^2}{l^2}$ |
| roll ($R_x$) | 0 | 0 | 0 | 0 | 0 | 0 | 0 |
| pitch ($R_y$) | 0 | 0 | d | d | e | $-e$ | $\frac{2e^2}{l^2}$ |
| yaw ($R_z$) | 0 | 0 | e | $-e$ | d | d | $\frac{2e^2}{l^2}$ |

| force/torque | $u_1$ | $u_2$ | $v_1$ | $v_2$ | $w_1$ | $w_2$ | $l'$ | $\frac{\Delta l}{l}$ |
|---|---|---|---|---|---|---|---|---|
| axial (x) | a | a | 0 | 0 | 0 | 0 | l | 0 |
| transverse (y) | 0 | 0 | b | b | c | $-c$ | $l\left[1+\left(\frac{2c}{l}\right)^2\right]^{\frac{1}{2}}$ | $\frac{2c^2}{l^2}$ |
| roll (about x) | 0 | 0 | 0 | 0 | 0 | 0 | l | 0 |
| pitch (about y) | 0 | 0 | d | d | e | $-e$ | $l\left[1+\left(\frac{2e}{l}\right)^2\right]^{\frac{1}{2}}$ | $\frac{2e^2}{l^2}$ |
| yaw (about z) | 0 | 0 | e | $-e$ | d | d | $l\left[1+\left(\frac{2e}{l}\right)^2\right]^{\frac{1}{2}}$ | $\frac{2e^2}{l^2}$ |

Axial force and roll result in no length change. Transverse force, pitch and roll result in equal and opposite transverse displacements at either end of the axis. The fractional length change is proportional to the square of this transverse displacement. The sizes of c and e depend on the material properties and absolute dimensions of the etalon. For an etalon made from ULE (ultra-low expansivity glass; Young's modulus, 67.6 GPa; Poisson ratio, 0.17; density, 2.21 g/cm$^3$) with an edge length of 50 mm, bore radius of 5 mm, mirror radius of 6.35 mm, mirror thickness of 4 mm and truncation at the cube vertices to a depth of 6.7 mm, a finite-element model gives a fractional sensitivity to acceleration (transverse) of order $10^{-18}$/ms$^{-2}$ and a fractional sensitivity to angular acceleration (pitch/yaw) of order $10^{-19}$/s$^{-2}$.

To constrain the etalon 10, a compressive force, directed towards the centre of the cavity, is applied at the supports 22-28 and again this results in elastic deformation. In general, this causes a change in the length and frequency of the cavity mode and one is then sensitive to changes in this applied force. In order to provide insensitivity against such deformation, the cuboidal spacer 16 is truncated at its vertices, the result being a structure in which the length of the cavity mode is made substantially insensitive to compression whilst retaining its insensitivity to inertial force. The principle is illustrated in FIGS. 5 and 6 described below.

FIGS. 1 to 4 show the geometry of the etalon 10 with its cuboidal spacer 16 supported at four points 22-28 in a tetrahedral configuration. The supports 22-28 are centred on the four vertex planes having normal vectors (1,1,1), (1,−1,−1), (−1,1,−1) and (−1,−1,1) and the centres of contact form the vertices of a tetrahedron. This is the most symmetric arrangement for the four vertices of a tetrahedron with respect to the axis, which provides sufficient and symmetric constraint in three dimensions and with the forces acting on the four points 22-28 being equal.

For a cube with an edge dimension of 50 mm, the dimensions are preferably as follows: bore radius, 5 mm; mirror radius, 6.35 mm; mirror thickness, 4 mm; cube vertices truncated to a depth of 6.7 mm.

Figure 5:
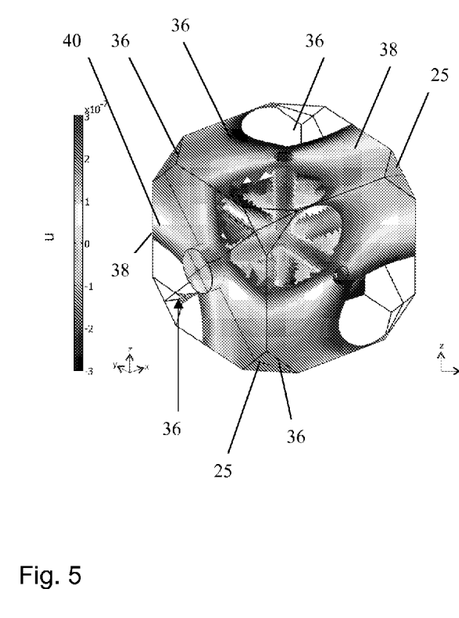
FIGS. 5 and 6 are respectively perspective and front elevational views of a finite-element model for a geometry representing a truncated cuboidal spacer, as is provided in the preferred embodiment of etalon taught herein, showing axial displacement under the action of a compressive force applied at four support elements provided tetrahedrally about the cube.
Figure 6:
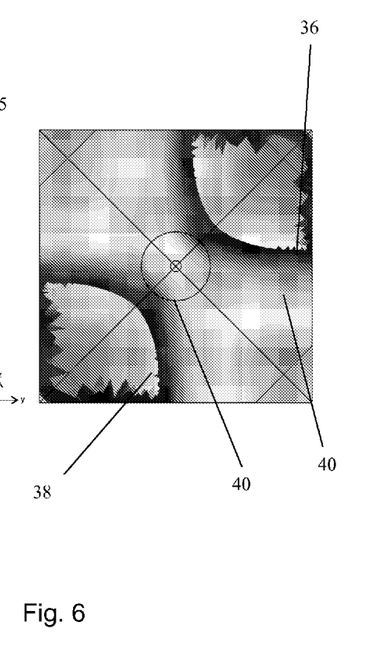

Referring now to FIGS. 5 and 6, these depict, respectively, perspective and front elevational views of a finite-element model of a geometry representative of a truncated cubic spacer element. They show axial displacement on application of a compressive force, directed towards the centre of the cavity, at the support points 22-28. The zones 36 indicate zones of positive axial displacement; zones 38 indicate zones of negative axial displacement; while zones 40 are zones with zero axial displacement. The colour scale in zones 38 is truncated so that at the supports, where the displacement is largest, the plot is absent and one sees through to the other side of the cube. For the geometry shown, with the vertices cut to a depth of 6.7 mm, the axial displacements and length change on axis are zero. Thus, the etalon 10 is insensitive to inertial forces due to acceleration in all six degrees of freedom whilst simultaneously being substantially insensitive to a compressive force directed towards the centre of the cavity.

In a practical realisation, frictional forces act at the supports and this means that the cavity is, in fact, constrained in 12 degrees of freedom: six corresponding to rigid-body motion arising from inertial forces and six corresponding to deformation arising from differential forces. For deformations where the supports are forced towards each other in any one of the directions defined by the edges of the cube, the length change on axis is nulled by virtue of the truncated geometry. For deformations where two supports are forced towards each other and two are forced away from each other, the axial displacements at the mirror centres are either zero or cancel out and there is no net length change on axis. Thus, the cavity is insensitive to differential forces in all degrees of freedom.

FIG. 7 shows the directions in which the forces act at the four support points for the 12 degrees of freedom which are constrained by the support when the effects of frictional forces are included. The six degrees of freedom which correspond approximately to rotation can be combined to give either pure rotations or deformations which are shown in FIG. 8. The translational and rotational degrees of freedom are activated by inertial forces. The deformational degrees of freedom are activated by differential forces.

Table 2 below gives the displacements for the six degrees of freedom corresponding to differential forces that can act on the etalon 10 and the corresponding fractional length changes. The quantities f-i denote displacements and are used to show the symmetries present. The column, $\Delta l/l$, uses the leading term in the Taylor expansion of l'. The terms in brackets ($D_1$, $D_2$, etc.) are the labels given to the degrees of freedom as they are shown in FIGS. 7 and 8.

TABLE 2

| differential force | $u_1$ | $u_2$ | $v_1$ | $v_2$ | $w_1$ | $w_2$ | $\frac{\Delta l}{l}$ |
| --- | --- | --- | --- | --- | --- | --- | --- |
| axial pinch ($D_1$) | −f | f | 0 | 0 | 0 | 0 | $\frac{2f}{l}$ |
| transverse pinch ($D_2$) | g | −g | 0 | 0 | 0 | 0 | $\frac{2g}{l}$ |
| transverse pinch ($D_3$) | g | −g | 0 | 0 | 0 | 0 | $\frac{2g}{l}$ |
| transverse deformation ($D_4$) | h | h | 0 | 0 | 0 | 0 | 0 |
| axial deformation ($D_5$) | 0 | 0 | i | i | 0 | 0 | 0 |
| axial deformation ($D_6$) | 0 | 0 | 0 | 0 | i | i | 0 |

In general, the deformations, $D_1$-$D_3$, result in equal and opposite axial displacements at either end of the axis and the fractional length change is proportional to this displacement. However, for the geometry shown in FIGS. 5 and 6, for which the axial displacements are zero under the action of a compressive force acting towards the centre of the cavity, the displacements under deformations, $D_1$-$D_3$, are also zero. The deformations, $D_1$-$D_3$, result in no length change.

Compression is, in fact, a special case of differential force and is equal to a sum of the deformations acting along the three orthogonal axes: $=D_1+D_2+D_3$. It therefore follows that, as the axial displacement is zero for the deformations, $D_1$-D3, for the particular geometry shown in FIGS. 5 and 6, the axial displacement under the action of a compressive force acting towards the centre of the cavity is also zero.

In an embodiment in which three orthogonal cavities are formed by bonding mirrors to opposite ends of all three bores, a depth of cut at the vertices can be found for which all three cavities are simultaneously insensitive to inertial forces, due to acceleration, and differential forces, in all degrees of freedom.

Figure 9:
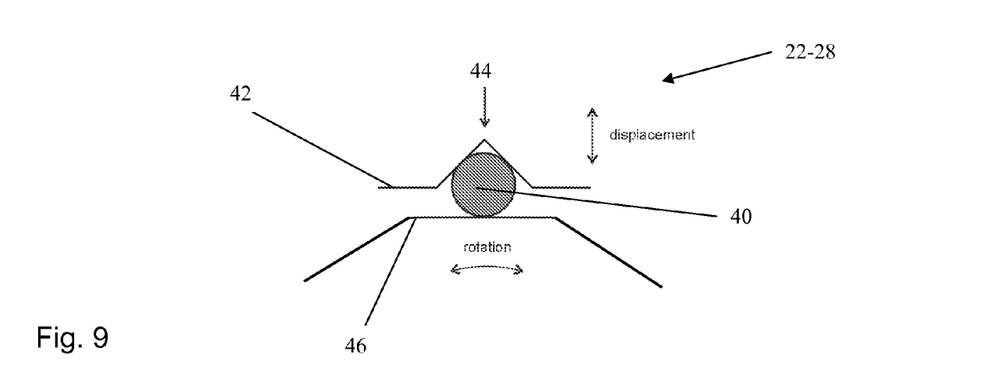
FIGS. 9 and 10 are cross-sectional views of embodiments of one of the support points of the etalon of FIGS. 1 to 4.

Referring now to FIG. 9, there is shown a preferred embodiment of support for the etalon 10 taught herein. As is disclosed above, the etalon 10 is preferably provided with four supports of the type shown in FIG. 9. Each support 22-28 includes a sphere 41 held in position by a conical housing 42 which is biased by a fixing (not shown) to apply pressure on the sphere 41 in a direction towards the centre point of the etalon 10, at the centre point of the spacer 16.

Figure 10:
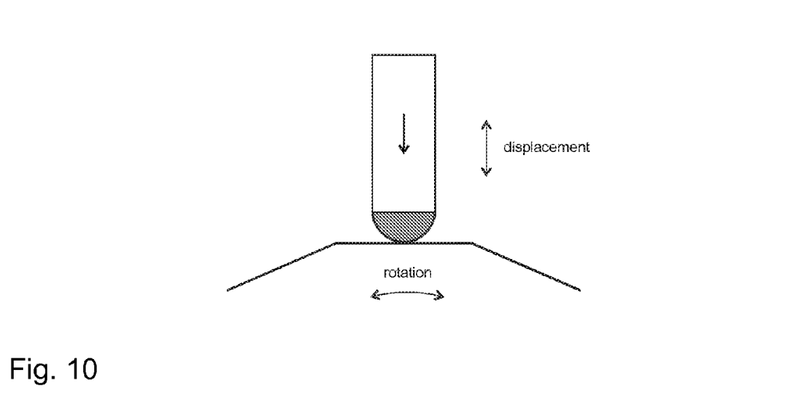

Referring to FIG. 10, there is shown an embodiment of the support in which each support consists of a hemisphere fixed to a post which is biased by a fixing (not shown) to apply pressure on the sphere 41 in a direction towards the centre point of the etalon 10, at the centre point of the spacer 16.

The cuboidal spacer 16 is polished flat so as to have a flat zone 46 at the location of each sphere 41, in a plane normal to the body diagonal centred on the point of contact. This arrangement constrains both displacement and rotation.

The supports 22-28 constrain motion in all six degrees of freedom (displacement and rotation). The etalon 10 is thus mounted on four spheres 41 held within fixed conical housings 42 and these make contact with the spacer 16 at the centre of the polished areas. A compressive force directed towards the centre of the cavity 44 is applied at all the supports 22-28 constrains displacement.

Figure 11:
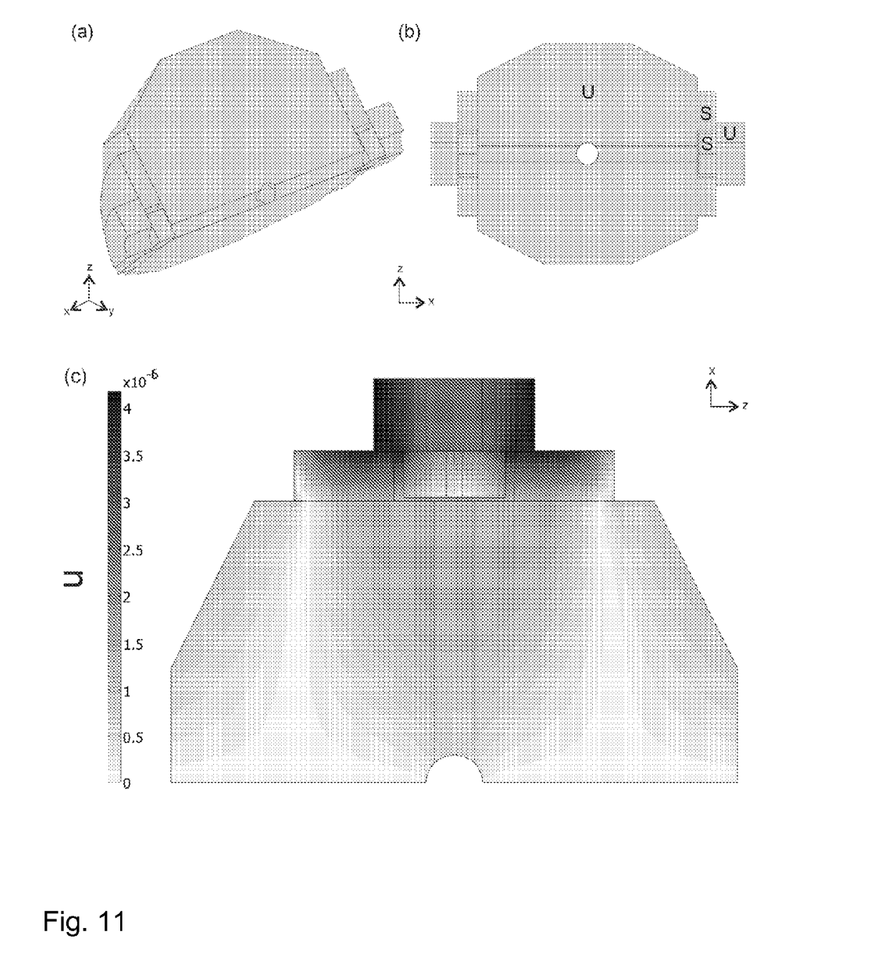

Referring now to FIG. 11 there is shown another embodiment of cuboidal etalon 100 which is substantially insensitive to force as well as temperature. The mirror (12, 14) substrates are preferably made from silica to ensure low thermal noise while the spacer 16 is preferably made from ultra-low expansivity glass (ULE) for thermal stability. The expansion of the mirrors 12, 14 is compensated for by the addition of a silica annulus 50 as shown in FIG. 11. The design is such that the zero in the effective coefficient of thermal expansion of the composite ULE-silica etalon 100 is unchanged from that of the ULE and can be selected to be at 20° C. or some other convenient temperature.

FIG. 11c shows a finite-element model of thermal expansion of the composite ULE-silica etalon at 20° C. The expansion of the mirrors 12, 14 is compensated for by the addition of the silica annulus 50. The zone 54 indicates displacement away from the mid-plane of the cavity. The central zone 58 exhibits virtually no displacement and zero displacement occurs at the mid-plane and at the mirror surfaces.

In FIGS. 11a and 11b the geometry of the etalon is modified to compensate for thermal expansion of the fused silica mirror. A quarter of the full geometry is shown to reveal the mirror mounting. ULE and fused silica components are labelled with U and S respectively. The mirror is re-entrant and its expansion is compensated by the insertion of a fused silica annulus, connected to the mirror via an annulus made from ULE. The fused silica annulus has a thickness of 4.4 mm and outer and inner radii of 20 and 7.5 mm respectively. The ULE annulus has a thickness of 6.4 mm and outer and inner radii of 10.05 and 3.5 mm respectively. The vertices of the cube are polished to a depth of 8.5 mm. FIG. 11c shows deformation of the etalon under the action of a step change in temperature. An eighth of the geometry is shown. The axial displacement at the centre of the mirror is zero.

The above-described embodiments provide an etalon structure which is stable when fixed, to withstand inertial forces and which is thus substantially insensitive to inertial forces due to acceleration in all degrees of freedom (linear and rotational) as well as to differential forces. The etalon is also stable to temperature variations.

It is to be appreciated that the materials used in the preferred embodiments and the dimensions and proportions of the various elements described in the preferred embodiments may be varied, that is need not be the same as those given in connection with the above-described preferred embodiments.

The disclosures in British patent application number 1019152.6, from which this application claims priority, and in the abstract accompanying this application are incorporated herein by reference.

The invention claimed is:

1. A Fabry-Perot etalon including first and second partial mirrors spaced from one another by a spacer element in the shape of a cube, having six sides arranged in three opposed pairs of sides, the two sides of one of the opposed pairs providing support, respectively, for the first and second mirrors; an optical cavity extending between the first and second partial mirrors and having an optical axis; the vertices of the spacer element being truncated.

2. An etalon according to claim 1, wherein said cavity is provided by a bore within the spacer element.

3. An etalon according to claim 2, wherein there are provided three bores in the spacer element, the bores extending orthogonally relative to one another through a centre point of the spacer element and to the centre of respective faces of the spacer element.

4. An etalon according to claim 2, wherein the or each bore is cylindrical.

5. An etalon according to claim 1, including a plurality of support elements for supporting the spacer element and being located symmetrically about the optical axis of the cavity.

6. An etalon according to claim 5, wherein a compressive force directed towards the centre of the cavity is applied at the supports.

7. An etalon according to claim 1, including four support elements.

8. An etalon according to claim 7, wherein the support elements are positioned tetrahedrally about the spacer element.

9. An etalon according to claim 7, wherein the support elements include holding spheres.

10. An etalon according to claim 9, wherein the spacer element is provided with flattened contact surfaces at the location of the holding spheres.

11. An etalon according to claim 1, wherein the first and second mirrors are curved.

12. An etalon according to claim 11, wherein the first and second mirrors are spherically curved.

13. An etalon according to claim 1, wherein the spacer element is formed from ultra-low expansivity glass.

14. An etalon according to claim 1, wherein the first and second mirror elements are provided on substrates made from silica.

15. An etalon according to claim 1, including an annulus between each of said mirrors and their associated side of the spacer element.

16. An etalon according to claim 15, wherein the annuli are made of silica.

17. An etalon according to claim 1, including six mirrors contacted respectively to the six sides of the cube to form three orthogonal cavities.

18. A Fabry-Perot etalon including first and second partial mirrors spaced from one another by a spacer element in the shape of a cube, an optical cavity extending between the first and second partial mirrors and having an optical axis, and a plurality of support elements for supporting the spacer element and being located on the spacer element symmetrically about the optical axis of the cavity.

19. An etalon according to claim 18, including six mirrors contacted to the spacer element to form three orthogonal cavities.

20. A Fabry-Perot etalon including first and second partial mirrors spaced from one another by a spacer element in the shape of a cube, which spacer element is provided with sides which provide support, respectively, for the first and second mirrors; an optical cavity extending between the first and second partial mirrors and having an optical axis; the vertices of the spacer element being truncated; and a plurality of support elements for supporting the spacer element and being located symmetrically about the optical axis of the cavity.

* * * * *